United States Patent
Lee et al.

(10) Patent No.: US 8,928,739 B2
(45) Date of Patent: Jan. 6, 2015

(54) THREE DIMENSIONAL IMAGE DISPLAY DEVICE

(75) Inventors: Hyong-Rae Lee, Asan-si (KR); Jae-Ho Jung, Asan-si (KR); Kwan-Woo Lee, Asan-si (KR); Tae-Hwan Kim, Seoul (KR); Dong-Gyoon Seo, Seoul (KR); Myoung Jun Chai, Seoul (KR)

(73) Assignee: Samsung Display Co., Ltd. (KR)

( * ) Notice: Subject to any disclaimer, the term of this patent is extended or adjusted under 35 U.S.C. 154(b) by 591 days.

(21) Appl. No.: 13/210,745

(22) Filed: Aug. 16, 2011

(65) Prior Publication Data

US 2012/0257026 A1      Oct. 11, 2012

(30) Foreign Application Priority Data

Apr. 6, 2011 (KR) .................. 10-2011-0031757

(51) Int. Cl.
| | |
|---|---|
| *H04N 13/02* | (2006.01) |
| *H04N 13/04* | (2006.01) |
| *G06F 3/038* | (2013.01) |
| *G09G 5/00* | (2006.01) |

(52) U.S. Cl.
CPC ................................ *H04N 13/0438* (2013.01)
USPC ............ 348/55; 345/211; 345/212; 345/419; 349/108

(58) Field of Classification Search
USPC ................................................... 348/41–161
See application file for complete search history.

(56) References Cited

U.S. PATENT DOCUMENTS

| | | | |
|---|---|---|---|
| 5,923,312 A * | 7/1999 | Okada et al. ................... 345/95 |
| 5,952,854 A | 9/1999 | Kubota et al. |
| 7,102,786 B2 * | 9/2006 | Takahashi et al. ............. 358/1.9 |
| 7,450,094 B2 | 11/2008 | Kim et al. |
| 7,499,008 B2 * | 3/2009 | Chen et al. ..................... 345/87 |
| 7,893,904 B2 * | 2/2011 | Shih et al. ...................... 345/88 |
| 8,106,940 B2 * | 1/2012 | Takagi et al. .................. 348/51 |
| 8,274,556 B2 * | 9/2012 | Cha et al. ...................... 348/54 |
| 8,456,519 B2 * | 6/2013 | Tsuchida ....................... 348/51 |
| 8,542,161 B2 * | 9/2013 | Chiang et al. ................. 345/55 |
| 8,564,627 B2 * | 10/2013 | Suzuki et al. ................. 345/690 |
| 8,605,138 B2 * | 12/2013 | Son et al. ...................... 348/51 |
| 2008/0068516 A1 * | 3/2008 | Mori et al. .................... 348/790 |
| 2008/0088566 A1 * | 4/2008 | Chiang et al. ................. 345/100 |
| 2008/0316596 A1 * | 12/2008 | Cha et al. ...................... 359/463 |
| 2009/0073155 A1 * | 3/2009 | Akimoto et al. .............. 345/211 |
| 2009/0273553 A1 * | 11/2009 | Song et al. .................... 345/94 |
| 2010/0265230 A1 * | 10/2010 | Kang ............................. 345/211 |
| 2010/0302634 A1 * | 12/2010 | Jung ............................. 359/465 |

(Continued)

FOREIGN PATENT DOCUMENTS

| | | |
|---|---|---|
| KR | 1020090054320 | 5/2009 |
| KR | 1020090110095 | 10/2009 |
| KR | 1020100048420 | 5/2010 |
| KR | 1020100071330 | 6/2010 |

*Primary Examiner* — Joseph Ustaris
*Assistant Examiner* — Talha Nawaz
(74) *Attorney, Agent, or Firm* — Cantor Colburn LLP

(57) ABSTRACT

A three dimensional image display device includes a display panel in which at least one of two consecutive left eye images and two consecutive right eye images are inputted, where the two consecutive left eye images are substantially the same as each other, and the two consecutive right eye images are substantially the same as each other, and where gate scanning directions of the two consecutive left eye images are opposite to each other, and gate scanning directions of the two consecutive right eye images are opposite to each other.

20 Claims, 16 Drawing Sheets

(56) References Cited

U.S. PATENT DOCUMENTS

2011/0090320 A1* 4/2011 Tsuchida .......................... 348/51
2011/0096146 A1* 4/2011 Hulyalkar et al. .............. 348/43
2011/0116166 A1* 5/2011 Jung et al. ..................... 359/465
2012/0013610 A1* 1/2012 Chae .............................. 345/419
2012/0154699 A1* 6/2012 Yu et al. .......................... 349/33
2013/0082999 A1* 4/2013 Ahn et al. ....................... 345/212
2013/0265347 A1* 10/2013 Bae et al. ...................... 345/691

* cited by examiner

THREE DIMENSIONAL IMAGE DISPLAY DEVICE

This application claims priority to Korean Patent Application No. 10-2011-0031757, filed on Apr. 6, 2011, and all the benefits accruing therefrom under 35 U.S.C. §119, the content of which in its entirety is herein incorporated by reference.

BACKGROUND OF THE INVENTION (a) Field of the Invention

Provided is a three dimensional image display device.

(b) Description of the Related Art

In general, a three-dimensional ("3D") image display technology allows a viewer to recognize three dimensional effects of objects using binocular parallax that is the most important factor for recognizing three dimensional effects from a short distance. In the 3D image display technology, different two-dimensional ("2D") images are transmitted to the left eye and the right eye, respectively, and when the image transmitted to the left eye (hereafter, referred to as "left eye image") and the image transmitted to the right eye (hereafter, referred to as "right eye image") are transmitted to the brain, the left eye image and the right eye image are converged in the brain and recognized as a three dimensional image having depth perception.

A 3D image display device uses binocular parallax and is typically classified into a stereoscopic type using shutter glasses or polarized glasses and an autostereoscopic type by arranging a lenticular lens and a parallax barrier in the display panel without glasses.

In the shutter glass type of the 3D image display device, the left eye image and right eye image are separately and continuously output, and the left eye shutter and the right eye shutter of the shutter glass are selectively opened and closed, thereby displaying three dimensional images,.

In the shutter glass type, a 2D mode and a 3D mode may be efficiently switched, and data may not be lost in the 2D and 3D modes. However, a crosstalk phenomenon by interfering the left eye image and the right eye image with each other may be generated, thereby deteriorating display quality of the 3D image.

Timing for applying voltage typically depends on the position of a panel. In general, when the panel is scanned toward a lower part from an upper part of the panel, timing for applying voltage to the lower part of the panel is delayed, and a time to output an image in the lower part of the panel may not be sufficient. Accordingly, the crosstalk phenomenon may be substantially generated in the lower part of the panel than in the upper part of the panel.

BRIEF SUMMARY OF THE INVENTION

In an exemplary embodiment of the invention, a three dimensional image display device includes a display panel in which at least one of two consecutive left eye images and two consecutive right eye images are inputted, where the two consecutive left eye images are substantially the same as each other, and the two consecutive right eye images are substantially the same as each other, and where gate scanning directions of the two consecutive left eye images are opposite to each other, and gate scanning directions of the two consecutive right eye images are opposite to each other.

In an exemplary embodiment, the two consecutive right eye images may be inputted after the two consecutive right eye images are inputted, or the two consecutive left eye images may be inputted after the two consecutive right eye images may be inputted.

In an exemplary embodiment, one of the two consecutive left eye images and one of the two consecutive right eye images may be inputted into two consecutive frames, and the gate scanning directions of the one of the two consecutive left eye images and the one of the two consecutive right eye image may be opposite to each other.

In an exemplary embodiment, an absolute value of a slope of a gray curve in an upper part or a lower part of the display panel may gradually decrease, and then increase thereafter.

In an exemplary embodiment, over-shoot driving or under-shoot driving may be used to display the two consecutive left eye images and the two consecutive right eye images.

In an exemplary embodiment, when a first image and a second image are consecutively inputted and a gray value of the second value is greater than a gray value of the first image, the gray value of the second image may increase.

In an exemplary embodiment, when the first image and the second image are consecutively inputted and the gray value of the second image is less than that of the first image, the gray value of the second image may decrease.

In an exemplary embodiment, the gate scanning direction may be determined by an inversion signal in which a high level and a low level are alternately repeated frame by frame.

In an exemplary embodiment, the three dimensional image display device may further include a gate driver which applies gate-on voltage to the display panel, where the gate driver includes a first scan starting signal wiring, a second scan starting signal wiring, and a signal processor which outputs a scan starting signal which indicates a start of a gate scanning, where the scan starting signal may be applied to the first scan starting signal wiring or the second scan starting signal wiring by the inversion signal.

In an exemplary embodiment, when the scan starting signal is applied to the first scan starting signal wiring, the gate-on voltage may start to be applied to a first gate line, and when the scan starting signal is applied to the second scan starting signal wiring, the gate-on voltage may start to be applied to a last gate line.

In an exemplary embodiment, the three dimensional image display device may further include a data driver which applies image data voltages to the display panel, where an output sequence of image data voltages may be changed in each frame by the inversion signal, the output sequence includes a forward sequence and a reverse sequence, and image data may be inputted into the data driver in the forward sequence or in the reverse sequence.

In an exemplary embodiment, when two consecutive two dimensional images are inputted into the display panel, gate scanning directions of the two consecutive two dimensional images may be the same as each other.

In an exemplary embodiment, the gate scanning direction may be controlled based on a three dimensional enable signal which has a low level when the two consecutive two dimensional images are inputted into the display panel, and has a high level when the two consecutive left eye images or the two consecutive right eye images are inputted.

In an exemplary embodiment, a three dimensional sync signal is outputted from a shutter member, where an open state or a closed state of the shutter member is synchronized with the three dimensional sync signal.

In an exemplary embodiment, the two consecutive left eye images may include a first left eye image and a second left eye image, the two consecutive right eye images may include a first right eye image and a second right eye image, and the three dimensional sync signal may be synchronized with the opened state of the shutter member in a period in which the second left eye image and the second right eye image are inputted.

In an exemplary embodiment, the three dimensional sync signal may be synchronized with the closed state of the shutter member in a period in which the first left eye image and the first right eye image are inputted.

In an exemplary embodiment, the three dimensional image display device may further include a backlight unit which emits light.

In an exemplary embodiment, the two consecutive left eye images may include a first left eye image and a second left eye image, the two consecutive right eye images may include a first right eye image and a second right eye image, and the backlight unit may be turned on in the period in which the second left eye image and the second right eye image are inputted.

In an exemplary embodiment, the backlight unit may be turned off in the period in which the first left eye image and the first right eye image are inputted.

In an exemplary embodiment, a frame frequency of the three dimensional image display device may be 240 hertz (Hz).

According to exemplary embodiments of the invention, a crosstalk phenomenon of a panel may be substantially reduced and luminance of the panel may substantially increase.

BRIEF DESCRIPTION OF THE DRAWING

The above and other features and advantages of the invention will become more apparent by describing in detailed exemplary embodiments thereof with reference to the accompanying drawings, in which.

DETAILED DESCRIPTION OF THE INVENTION

Figure 1:
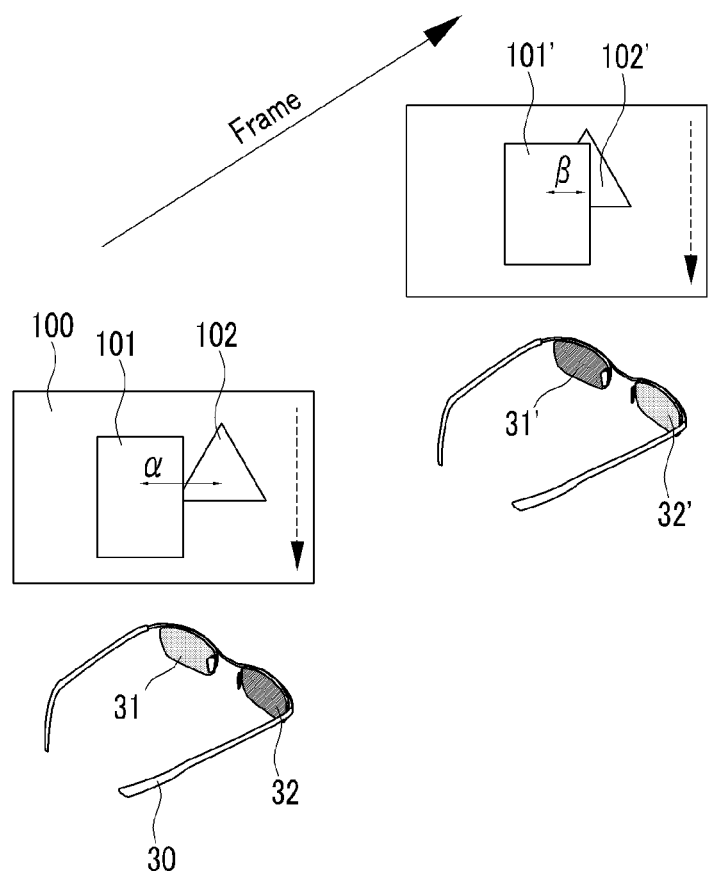
FIG. 1 is a schematic diagram showing an operation of an exemplary embodiment of a three dimensional image display device according to an the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, an exemplary embodiment of a three dimensional image display device according to the invention will be described in detail with reference to FIGS. 1 to 5.

Figure 2:
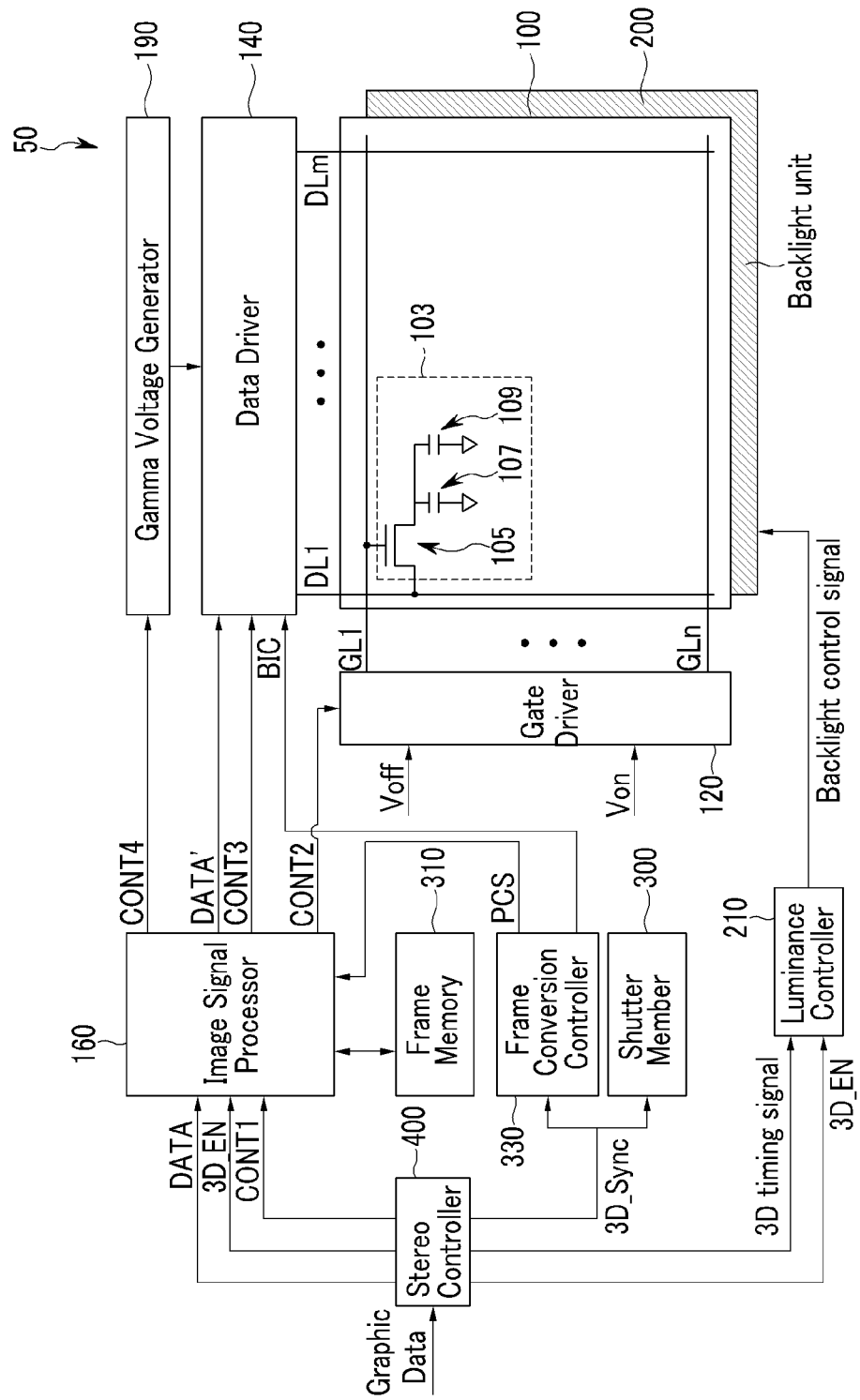
FIG. 2 is a block diagram showing an exemplary embodiment of a three dimensional image display device according to the invention.
Figure 3:
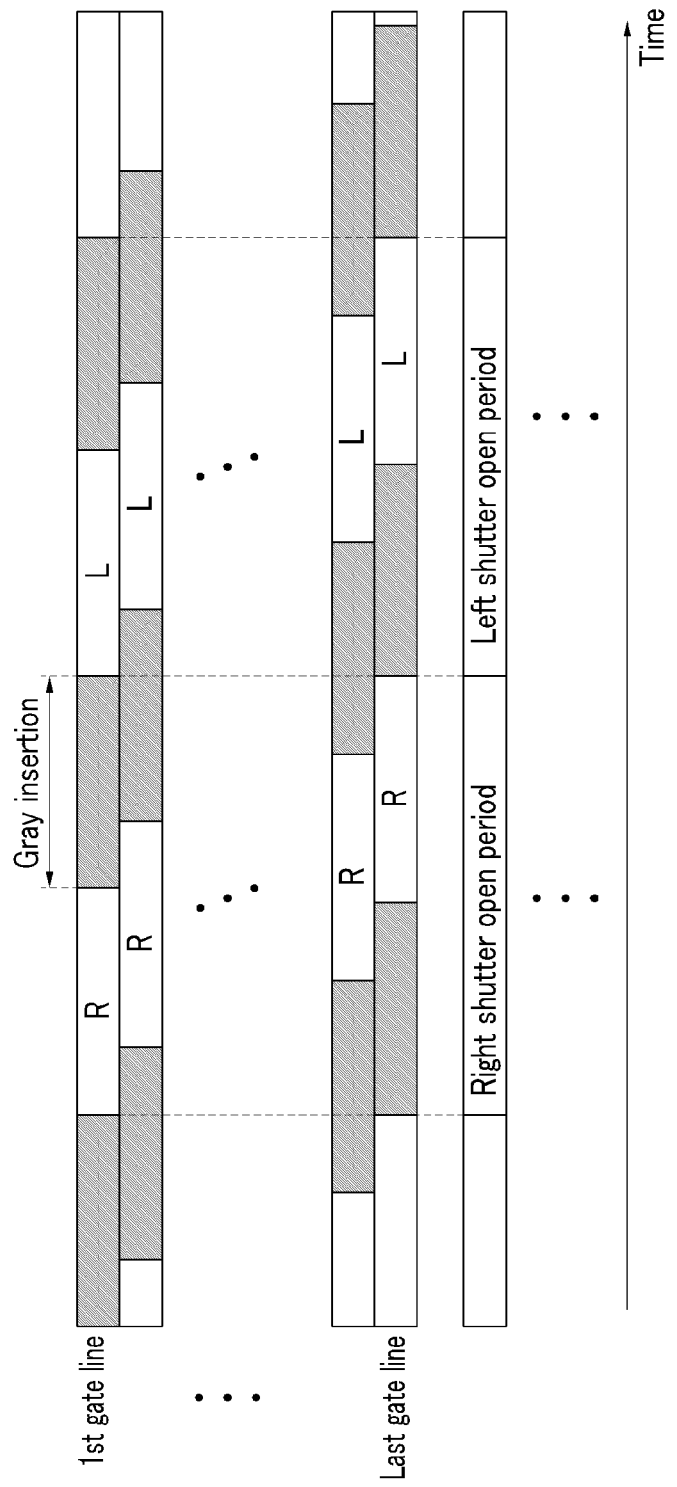
FIG. 3 is a signal timing diagram of signals in an exemplary embodiment of a three dimensional image display device according to the invention.
Figure 4:
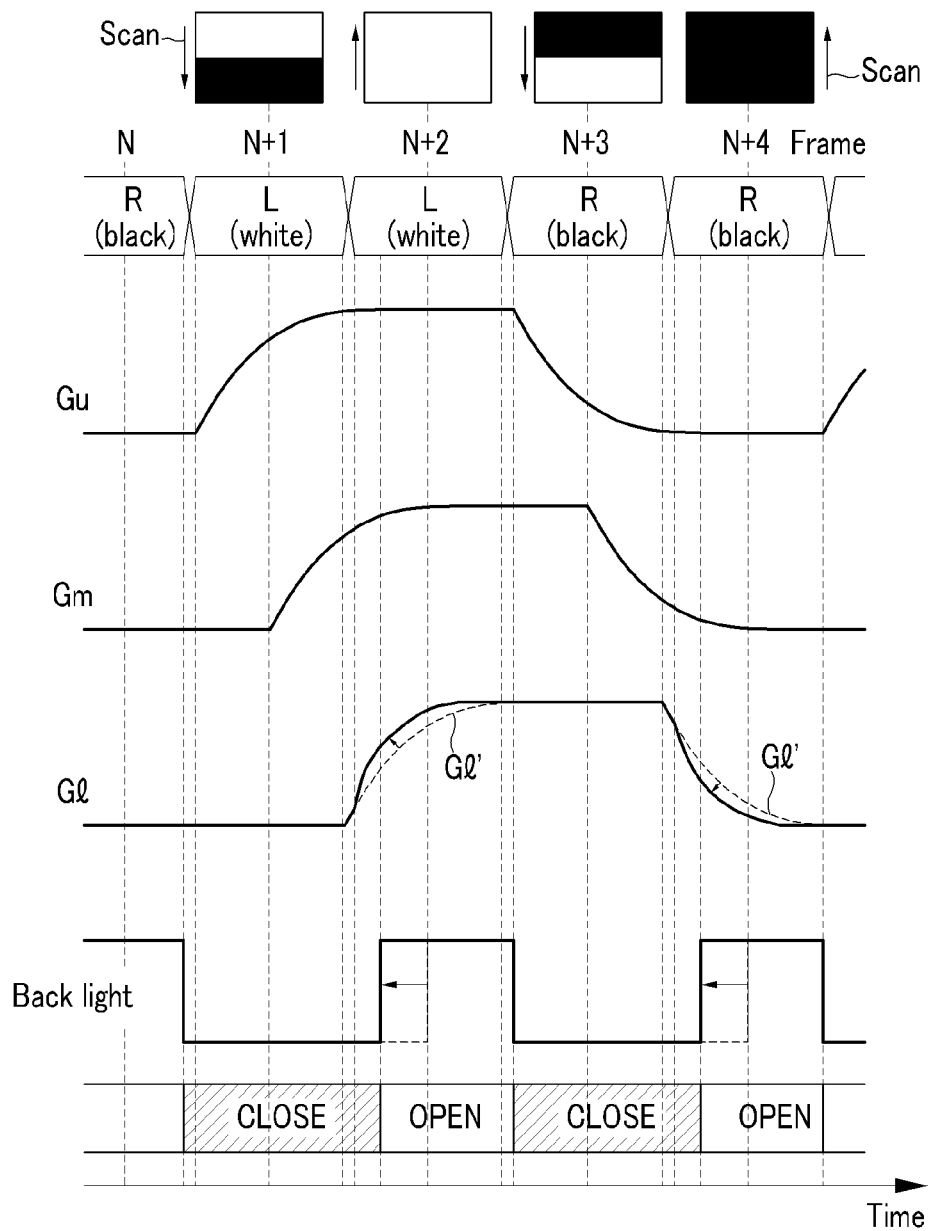
FIG. 4 is a signal timing diagram of signals and luminance of a three dimensional image display device according to the invention.
Figure 5:
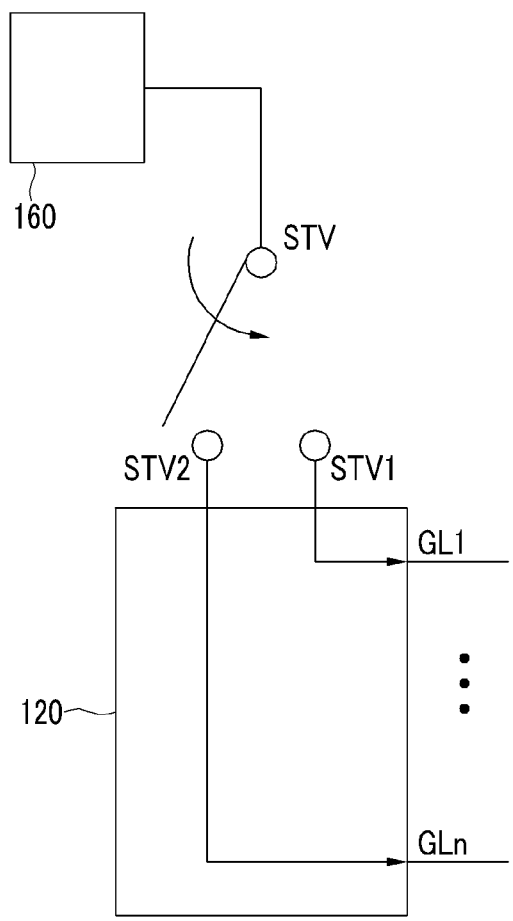
FIG. 5 is a block diagram showing a gate driver of a three dimensional image display device according to the invention.

FIG. 1 is a schematic diagram showing an operation of an exemplary embodiment of a three dimensional image display device according to the invention, FIG. 2 is a block diagram showing an exemplary embodiment of a three dimensional image display device according to the invention, FIG. 3 is a signal timing diagram of signals in an exemplary embodiment of a three dimensional image display device according to the invention, FIG. 4 is a signal timing diagram of signals and luminance of an exemplary embodiment of a three dimensional image display device according to the invention, and FIG. 5 is a block diagram showing an exemplary embodiment of a gate driver of a three dimensional image display device according to the invention.

A display panel 100 may include a liquid crystal display, an organic light emitting display, a plasma display and an electrophoretic display. Hereinafter, an exemplary embodiment, in which the display panel 100 is the liquid crystal display, will be described for convenience of explanation.

Referring to FIGS. 1 and 2, the display panel 100 may include an upper substrate, a lower substrate, and a liquid crystal layer disposed between the upper substrate and the lower substrate. The display panel 100 changes an alignment direction of liquid crystals in the liquid crystal layer by an electric field generated therein, and controls transmittance of light to display an image.

In an exemplary embodiment, gate lines GL1 to GLn, data lines DL1 to DLm, a pixel electrode and a thin film transistor 105 connected thereto are disposed on the lower substrate. The thin film transistor 105 controls voltage applied to the pixel electrode based on signals applied to the gate lines GL1 to GLn and the data lines DL1 to DLm. The pixel electrode may include a transflective pixel electrode having a transmissive region and a reflective region. In an exemplary embodiment, a storage capacitor 107 may be additionally included, and the storage capacitor 107 allows the voltage applied to the pixel electrode to be retained for a predetermined time. In one exemplary embodiment, for example, each pixel 103 may include the thin film transistor 105, the storage capacitor 107 and a liquid crystal capacitor 109.

In an exemplary embodiment, a black matrix, a color filter and a common electrode may be disposed on the upper substrate which is opposite to the lower substrate. In an exemplary embodiment, at least one of the color filter, the black matrix and the common electrode disposed on the upper substrate may be disposed on the lower substrate, and when both the common electrode and the pixel electrode are disposed on the lower substrate, at least one of both electrodes may have a linear form.

The liquid crystal layer may include twisted nematic ("TN") mode liquid crystals, vertically aligned ("VA") mode liquid crystals, electrically controlled birefringence ("ECB") mode liquid crystals, and the like.

A polarizer is attached to each of an outer surface of the upper substrate and an outer surface of the lower substrate. In an exemplary embodiment, a compensation film may be additionally provided between the substrate and the polarizer.

A backlight unit 200 includes a light source. In an exemplary embodiment, the light source may include a fluorescent lamp such as a cold cathode fluorescent lamp ("CCFL") and a light emitting diode ("LED"), for example. In an exemplary embodiment, the backlight unit may additionally include a reflection plate, a light guide plate, a luminance improvement film and the like.

Referring to FIG. 2, a display apparatus 50 may include a display panel 100, a backlight unit 200, a data driver 140, a gate driver 120, an image signal processor 160, a gamma voltage generator 190, a luminance controller 210, a shutter member 300, a frame memory 310, a frame conversion controller 330 and a stereo controller 400. The stereo controller 400 may transmit a three-dimensional ("3D") timing signal and a 3D enable signal 3D_En to the luminance controller 210. The luminance controller 210 may transmit a backlight control signal to the backlight unit 200. The backlight unit 200 may be turned on or turned off based on the backlight control signal from the stereo controller 400 through the luminance controller 210. The backlight control signal transmitted to the backlight unit 200 may turn on or turn off the backlight unit 200 for a predetermined time. In one exemplary embodiment, for example, the backlight control signal transmitted to the backlight unit 200 may turn on the backlight unit 200 for a vertical blank or turn off the backlight unit 200 for a time other than the vertical blank.

The stereo controller 400 may transmit a 3D sync signal 3D_sync to the shutter member 300 and the frame conversion controller 330. The shutter member 300 may be electrically connected with the stereo controller 400. The shutter member 300 may receive the 3D sync signal 3D_sync through wireless infrared communication. The shutter member 300 may operate in response to the 3D sync signal 3D_sync or a modified 3D sync signal. The 3D sync signal 3D_sync may include a signal which controls, e.g., opens or closes, a left eye shutter or a right eye shutter. The frame conversion controller 330 may transmit control signals PCS and BIC to the image signal processor 160 and the data driver 140.

The stereo controller 400 may transmit display data DATA, the 3D enable signal 3D_En, and a first control signal CONT1 to the image signal processor 160. The image signal processor 160 may transmit various kinds of display data DATA' and other control signals, e.g., a second control signal CONT2, a third control signal CONT3 and a fourth control signal CONT4, to the display panel 100 through the gate driver 120, the data driver 140 and the gamma voltage generator 190 to display an image on the display panel 100. In an exemplary embodiment, the display data DATA may include left eye image data and right eye image data.

Referring to FIG. 1, the shutter member 300 may spectacle-type shutter glasses 30, but is not limited thereto and may include mechanical shutter glasses (e.g., goggle), optical shutter glasses and the like. The shutter glasses 30 are synchronized with the display panel 100 to allow left eye shutters 32 and 32' and left eye shutters 31 and 31' to alternately block light at a predetermined cycle. The right eye shutters may be in a closed state 32 or an opened state 32', and the left eye shutters may be in the opened state 31 or the closed state 31'. In one exemplary embodiment, for example, the left eye shutter may be in the closed state 31' while the right eye shutter is in the opened state 32', and the right eye shutter may be in the closed state 32 while the left eye shutter is in the opened state 31. In an exemplary embodiment, both the left eye shutter and the right eye shutter may be in the opened state or in the closed state.

A shutter of the shutter glasses 30 may use technology used in a liquid crystal display, an organic light emitting diode display, an electrophoretic display, and the like, but the invention is not particularly limited thereto. In one exemplary embodiment, for example, the shutter may include two transparent conductive layers and a liquid crystal layer interposed therebetween. A polarization film may be provided on a surface of the conductive layers. A liquid crystal material rotates by voltage applied to the shutter, and the shutter may be in the opened state or in the closed state by the rotation.

In one exemplary embodiment, for example, left eye images 101 and 102 are outputted to the display panel 100, and the left shutter 31 of the shutter glasses 30 is in the opened state OPEN, in which light is transmitted, and the right eye shutter 32 is in the closed state CLOSE, in which light is blocked. In such an embodiment, the right eye images 101' and 102' are outputted to the display panel 100, and the right shutter 32' of the shutter glasses 30 is in the opened state OPEN, in which light is transmitted and the left eye shutter 31' is in the closed state CLOSE, in which light is blocked. Therefore, the left eye image is recognized by only the left eye for a predetermined time, the right eye image is recognized by only the right eye for the subsequent predetermined time, and a 3D image having depth perception is recognized by a difference between the left eye image and the right eye image.

The image recognized by the left eye is an image in which a quadrangle 101 and a triangle 102 are distant from each other by a distance α. The image recognized by the right eye is an image in which a quadrangle 101' and a triangle 102' are distant from each other by a distance β. Herein, α and β may have different values. When the distances, by which the images recognized by both eyes are distant from each other, are different, the eyes have different distance perceptions with respect to the quadrangle and the triangle, and it is recognized that the triangle is distant in the rear of the quadrangle, such that the depth perception occurs. In an exemplary embodiment, a distance (depth perception) in which both eyes feel that both objects are distant from each other may be effectively controlled by controlling the distances α and β by which the triangle and quadrangle are distant from each other.

Referring to FIG. 1, the direction of an arrow shown in the display panel 100 indicates a sequence, in which gate-on voltage is applied to a plurality of gate lines that extend substantially in a column direction. In an exemplary embodiment, the gate-on signal may be applied from an upper gate line to a lower gate line of the display panel 100 in sequence.

In one exemplary embodiment, for example, the display panel 100 may display the left eye images 101 and 102 as follows. The gate-on voltage is applied sequentially to the gate lines to apply data voltage to the pixel electrode through the thin film transistor connected to the corresponding gate line. In such an embodiment, the applied data voltage is the data voltage (hereinafter, referred to as "left eye data voltage") for displaying the left eye images 101 and 102, and the applied left eye data voltage may be retained for a predetermined time by the storage capacitor. In such an embodiment, the data voltage (hereinafter, referred to as "right eye data voltage") for displaying the right eye images 101' and 102' is applied, and may be retained for a predetermined time by the storage capacitor.

As shown in the signal timing diagram of FIG. 3, the gate-on signal is applied sequentially from the first gate line to the last gate line, and the right eye image R may be applied sequentially to a plurality of pixels connected to the corresponding gate line or the left eye image L may be applied sequentially to a plurality of pixels connected to the corresponding gate line. In such an embodiment, while the right eye image R is applied sequentially to the plurality of pixels connected to the corresponding gate line, the right eye shutter may be in the opened state and the left eye shutter may be in the closed state. While the left eye image L is applied sequentially to the plurality of pixels connected to the corresponding gate line, the left eye shutter may be in the opened state and the right eye shutter may be in the closed state.

An image having a predetermined gray value may be inputted between an input period of the right eye image R and an input period of the left eye image L ("gray insertion"). In one exemplary embodiment, for example, after the right eye image R is displayed on the display panel, images of black and white are displayed on an entire screen, and then, the left eye image L may be displayed. In an exemplary embodiment, the predetermined gray value is not limited to black or white, and may be various values. When an image having a predetermined gray value is inserted into the entire screen of the display panel, a crosstalk phenomenon between the right eye image and the left eye image is substantially reduced or effectively prevented.

Referring to FIG. 4, two right eye images are consecutively inputted after two left eye images are consecutively inputted. Two consecutive left eye images are substantially the same as each other, and two consecutive right eye images are substantially the same as each other. In one exemplary embodiment, for example, the white image may be inputted into both an N+1 frame and an N+2 frame, and the black image may be inputted into both an N+3 frame and an N+4 frame. In an exemplary embodiment, the images in two consecutive frames are substantially the same as each other, but the images are not limited to the black or white. In an alternative exemplary embodiment, the images may be outputted similarly in two frames in which various images are consecutive. In one exemplary embodiment, for example, a frame frequency of the three dimensional image display device may be 240 hertz (Hz).

In an exemplary embodiment, gate scanning directions of two consecutive frames are opposite to each other. In one exemplary embodiment, for example, the gate scanning direction of the N+1 frame is a downward direction of the panel, the gate scanning direction of the N+2 frame is an upward direction of the panel, the gate scanning direction of the N+3 frame is the downward direction of the panel, and the gate scanning direction of the N+4 frame is the upward direction of the panel.

Referring to FIG. 4, when the black image is inputted into the N frame as the right eye image and the white image is inputted into the N+1 frame as the left eye image, the white image may be gradually outputted toward the lower part from the upper part of the panel based on the gate scanning direction during the N+1 frame, and the white image may be outputted on the entire panel during the N+2 frame. When the black image is inputted into the N+3 frame as the right eye image, the black image may be gradually outputted toward the lower part from the upper part of the panel based on the gate scanning direction during the N+3 frame, and the black image may be outputted on the entire panel during the N+4 frame.

In an exemplary embodiment, when the white image is inputted into two consecutive frames, e.g., the N+1 frame and the N+2 frame, a gray Gu of an upper end portion of the panel may be gradually changed from the black to the white from approximately the time when the N+1 frame starts to approximately the time when the N+2 frame starts due to a response speed of the panel, and the white may be maintained during the N+2 frame. A gray Gm of a middle portion of the panel may be gradually changed from the black to the white from approximately the middle of the N+1 frame to approximately the middle of the N+2 frame due to the response speed of the panel, and the white may be maintained from approximately the middle of the N+2 frame to approximately the middle of the N+3 frame. A gray Gl of a lower end portion of the panel is gently changed to the white from approximately the time when the N+1 frame ends to approximately the time when the N+2 frame starts, and thus, the gray GI of the lower end portion may be steeply changed to the white from the time when the N+2 frame starts because white data voltage is applied to the lower end portion of the panel when the N+1 frame ends and then, the white data voltage is applied again to the lower end portion of the panel when the N+2 frame starts immediately after the N+1 frame ends. In one exemplary embodiment, for example, an absolute value of a slope of a curve for the gray GI of the lower end portion of the panel gradually decreases and the, increases thereafter. In such an embodiment, a curve form of the gray GI of the lower end portion of the panel may be changed as shown in FIG. 4 since the gate scanning directions are different from each other in two consecutive frames while the same image is inputted into the two consecutive frames. Accordingly, the white image may be outputted during an extended time in the N+2 frame, and uniformity in the outputted white image may increase throughout the entire surface of the panel, and the crosstalk phenomenon may substantially decrease. In one exemplary embodiment, for example, when the panel is the liquid crystal display, a charging time of the lower part of the panel becomes faster and a response speed of the liquid crystal in the lower part of the panel becomes faster. In such an embodiment, uniformity in an outputted image may increase throughout the entire surface of the panel, and the crosstalk phenomenon may substantially decrease.

In contrast, when the white image is inputted into the N+1 frame and the N+2 frame, but the gate scanning directions of both the N+1 frame and the N+2 frame are the downward direction, a gray GI' of the lower end portion of the panel is gently changed to the white, and the time during which the white image is outputted throughout the entire surface of the panel may become shorter. Accordingly, the crosstalk phenomenon may substantially increase.

In an exemplary embodiment, when the black image is inputted into both two consecutive frames, the gray Gu of the upper end portion of the panel may be gradually changed from the white to the black from approximately the time when the N+3 frame starts to approximately the time when the N+4 frame starts due to the response speed of the panel, and the black may be maintained during the N+4 frame. The gray Gm of the middle portion of the panel may be gradually changed from the white to the black from approximately the middle of the N+3 frame to approximately the middle of the N+4 frame due to the response speed of the panel and the black may be maintained from approximately the middle of the N+4 frame to approximately the middle of an N+5 frame. The gray GI of the lower end portion of the panel is gently changed to the black from approximately the time when the N+3 frame ends to approximately the time when the N+4 frame starts and thereafter, may be steeply changed to the black from the time when the N+4 frame starts. The reason is that black data voltage is applied to the lower end portion of the panel when the N+3 frame ends and thereafter, the black data voltage is again applied to the lower end portion of the panel immediately when the N+4 frame starts. In one exemplary embodiment, for example, the absolute value of the slope of the curve for the gray GI of the lower end portion of the panel gradually decreases and thereafter, increases. In other words, since the gate scanning directions are different from each other in two consecutive frames while the same image is inputted into the two consecutive frames, the change curve form of the gray GI of the lower end portion of the panel of FIG. 4 is acquired. Accordingly, the black image may be longer outputted in the N+4 frame and uniformity in the outputted black image may increase throughout the entire surface of the panel, and as a result, the crosstalk phenomenon may decrease. In one exemplary embodiment, for example, when the panel is the liquid crystal display, the charging time of the lower part of the panel becomes faster, the response speed of the liquid crystal in the lower part of the panel becomes faster. In such an embodiment, uniformity in the outputted image may increase throughout the entire surface of the panel, and the crosstalk phenomenon may be substantially reduced or effectively prevented.

In contrast, when the black image is inputted into the N+3 frame and the N+4 frame, but the gate scanning directions of both the N+3 frame and the N+4 frame are the downward direction, the gray GI' of the lower end portion of the panel is gently changed to the black and the time during the black image is outputted throughout the entire surface of the panel may be shorter. Accordingly, the crosstalk phenomenon may substantially increase.

As shown in Table 1 below, the crosstalk depending on the position of the panel was measured. In the exemplary embodiment of the three dimensional image display device, while the same image is inputted into two consecutive frames, the gate scanning directions of the two consecutive frames are different from each other. In the comparative embodiment of the three dimensional image display device, while the same image is inputted into two consecutive frames, the gate scanning directions of the two consecutive frames are the same as each other.

TABLE 1

|  |  | Crosstalk | |
| --- | --- | --- | --- |
|  |  | Comparative embodiment | Exemplary embodiment |
| Position of panel | Upper | 2.50% | 3.20% |
|  | Middle | 4.20% | 4.00% |
|  | Lower | 10.40% | 5.20% |

As shown in Table 1, in the exemplary embodiment, the crosstalk in the lower part of the panel substantially decreases and the uniformity in the outputted image is substantially improved throughout the entire surface of the panel.

When the display panel includes the backlight unit, a turn-on time of the backlight unit substantially increases, and the luminance of the panel thereby substantially increases. In such an embodiment, the luminance is substantially improved in the shutter type three dimensional image display device. When two consecutive left eye images are a first left eye image and a second left eye image and the two consecutive right eye images are a first right eye image and a second right eye image, the backlight may be turned on in a period in which the second left eye image and the second right eye image are inputted, and the backlight may be turned off in a period in which the first left eye image and the first right eye image are inputted.

In such an embodiment, since an open time of the shutter member 300 may increase, the luminance of the panel viewed through the shutter member may be improved. The 3D sync signal 3D_sync may be synchronized with the opened state or the closed state of the shutter member. When two consecutive left eye images are the first left eye image and the second left eye image and two consecutive right eye images are the first right eye image and the second right eye image, the 3D sync signal 3D_sync may be synchronized with the opened state of the shutter member 300 in the period in which the second left eye image and the second right eye image are inputted. The 3D sync signal 3D_sync may be synchronized with the closed state of the shutter member in the period in which the first left eye image and the first right eye image are inputted.

In an exemplary embodiment, when a 2D image is displayed, different images may be inputted for each frame and the gate scanning directions are the same as each other in all frames. When the 2D image is inputted into the display panel 100, the 3D enable signal 3D_EN may be in a low level, and when the left eye image or the right eye image is inputted into the display panel 100, the 3D enable signal 3D_EN may be in a high level.

In an exemplary embodiment, when a difference between a gray of an inputted image in a previous frame of two consecutive frames and a gray of an inputted image in a current frame of two consecutive frames is large, over-shoot driving or under-shoot driving may be selectively applied to the display panel. In one exemplary embodiment, for example, when the image inputted in the previous frame is the black image and the image inputted in the current frame is a bright image having a relatively large gray value, the white data voltage higher than normal data voltage is applied in the current frame, and an image actually displayed by the panel in the current frame may be substantially similar to the image inputted in the current frame. The driving is referred to as the over-shoot driving. When the image inputted in the previous frame is the white image and the image inputted in the current frame is a dark image having a relatively small gray value, the black data voltage lower than the normal data voltage is applied in the current frame, and the image actually displayed in the panel in the current frame may be substantially similar to the image inputted in the current frame. The driving is referred to as the under-shoot driving. In particular, a modification of a three dimensional image will be described in greater detail with reference to FIGS. 6 to 15.

When the over-shoot driving is applied, the gray GI of the lower end portion of the panel may be more steeply changed to the white image in the N+2 frame. When the under-shoot driving is applied, the gray GI of the lower end portion in the N+4 frame may be more steeply changed to the black image. Accordingly, the uniformity in the outputted image may further increase throughout the entire surface of the panel, and the crosstalk phenomenon may further decrease.

Referring to FIG. 5, a scan starting signal STV outputted from the signal processor 160 is applied to a first scan starting signal wiring STV1 or a second scan starting signal wiring STV2 of the gate driver 120 according to a reverse signal REV. When the scan starting signal STV is applied to the first scan starting signal wiring, the gate-on voltage starts to be applied to the first gate line GL1 and the gate-on voltage is applied sequentially to the gate lines GL2 to GLn downwards. When the scan starting signal STV is applied to the second scan starting signal wiring, the gate-on voltage starts to be applied to the last gate line GLn and the gate-on voltage is applied sequentially to the gate lines GLn-1 to GL1 upwards.

The reverse signal REV has the high level or the low level frame by frame, and the high level and the low level are alternately repeated in the reverse signal REV. The existing signal which is reversed by the unit of the frame may be used among the signals outputted from the signal processor 160. In one exemplary embodiment, for example, a polarizing signal POL which changes a polarity of a data signal may be used. In an alternative exemplary embodiment, a signal reversed to the high level and the low level may be additionally generated in each frame.

In an exemplary embodiment, a left and right option signal (L/R option) to determine a scanning direction of the gate driver 120 may be used. In one exemplary embodiment, for example, when the left and right option signal (L/R option) is in the high level, the gate scanning may be performed toward the lower part from the upper part by the reverse signal, and when the left and right option signal (L/R option) is in the low level, the gate scanning may be performed toward the upper part from the lower part by the reverse signal.

A sequence of the image data inputted into the data driver 140 may be controlled based on the reverse signal REV and the scanning direction of the gate driver 120. In one exemplary embodiment, for example, when the gate scanning is performed from the upper part to the lower part by the reverse signal REV, the image data are outputted from the signal processor 160 in a forward sequence from the image data for the upper part of the panel to the image data for the lower part of the panel, and the outputted image data are inputted into the data driver 140. When the gate scanning is performed from the lower part to the upper part by the reverse signal REV, the image data are outputted from the signal processor 160 in a reverse sequence from the image data for the lower part of the panel to the image data for the upper part of the panel, and the outputted image data are inputted into the data driver 140. In an exemplary embodiment, an output sequence of image data inputted in a predetermined direction from an external device, e.g., a graphic inputter, is reversed in each frame by the signal processor 160, and the image data in the forward sequence and the image data in the reverse sequence may be alternately outputted from the signal processor 160 frame by frame. In an alternative exemplary embodiment, the sequence of the image data may be reversed in each frame by an additional image data reverse unit (not shown) in addition to the signal processor 160, and the image data in the forward sequence and the image data in reverse sequence may be alternately outputted from the image data reverse unit in each frame.

Hereinafter, the modification of data voltage applied to a liquid crystal display panel will be described with reference to FIGS. 6 to 11.

Figure 6:
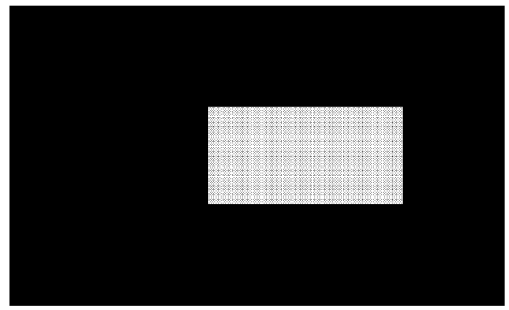
FIGS. 6 and 7 are diagrams showing an image to be displayed in an exemplary embodiment of a three dimensional image display device.
Figure 7:
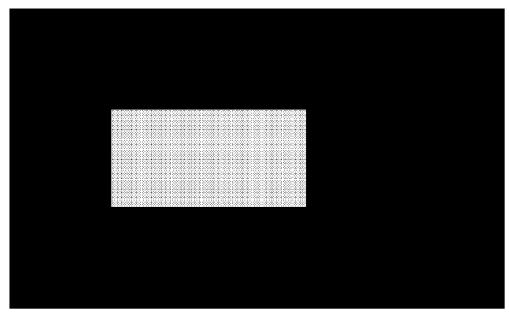
Figure 8:
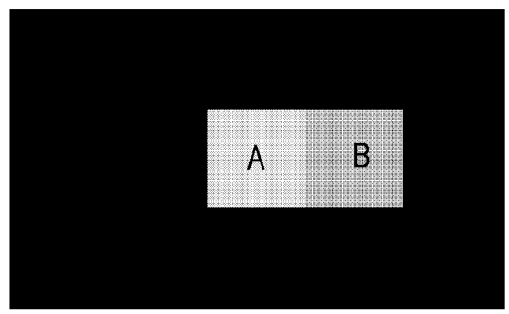
FIGS. 8 and 9 are diagrams showing an image actually displayed in the exemplary embodiment of a three dimensional image display device of FIGS. 6 and 7.
Figure 9:
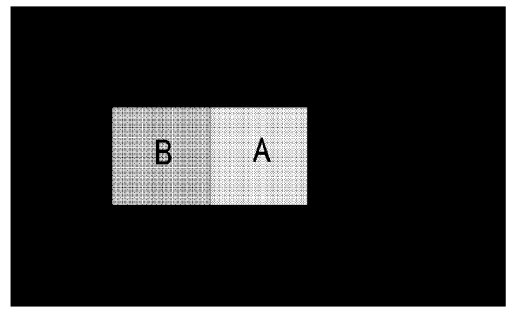
Figure 10:
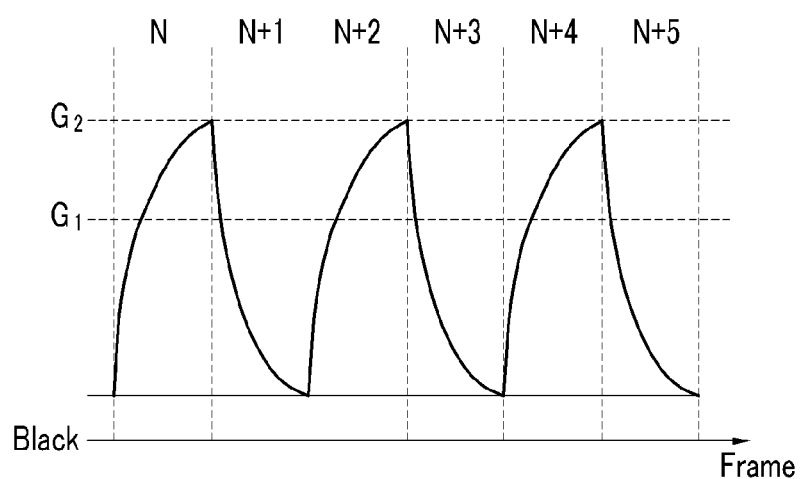
FIG. 10 is a graph showing luminance level versus frame in a region A of FIGS. 8 and 9.
Figure 11:
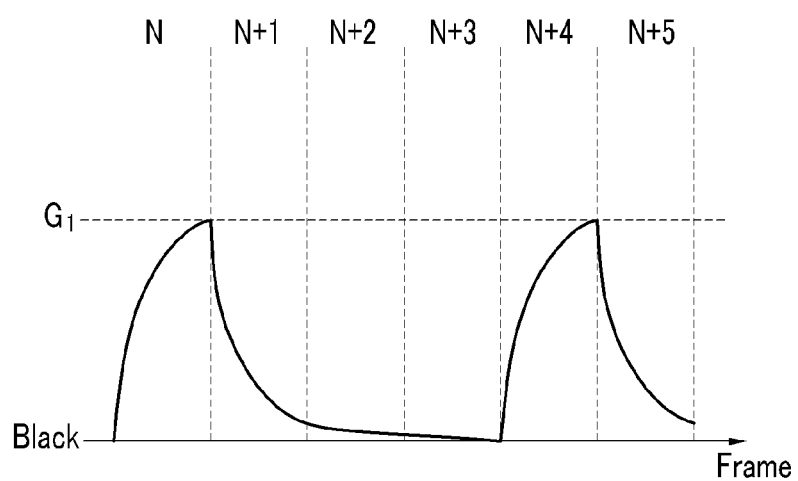
FIG. 11 is a graph showing luminance level versus frame in a region B of FIG. 9.

FIGS. 6 and 7 are diagrams showing an image to be displayed in an exemplary embodiment of a three dimensional image display device, FIGS. 8 and 9 are diagrams showing an image actually displayed in the exemplary embodiment of FIGS. 6 and 7, FIG. 10 is a graph showing luminance level versus frame in a region A of FIGS. 8 and 9, and FIG. 11 is a graph showing luminance level versus frame in a region B of FIG. 9.

FIG. 6 shows a liquid crystal display panel displaying a left eye image in an N frame, and FIG. 7 shows a liquid crystal display panel displaying a right eye image in an N+3 frame.

FIGS. 6 and 7 have an overlapping region (i.e., a region indicated as A in FIGS. 8 and 9) and a non-overlapping region (i.e., a region indicated as B in FIGS. 8 and 9). An outer part of a quadrangle displays the black in FIGS. 6 and 7.

When voltage is applied to the liquid crystal display panel to display the images shown in FIGS. 6 and 7, the images shown in FIGS. 8 and 9 are actually displayed. In such an embodiment, the left eye image and the right eye image are overlapping each other in a region A, and the region A is displayed by luminance G2 to be displayed, as shown in FIG. 10. However, a region B, in which the left eye image and the right eye image are not overlapping each other, is displayed by luminance G1 lower than the luminance to be displayed, as shown in FIG. 11.

In FIGS. 10 and 11, changes of luminance level according to the frame are shown. In FIGS. 10 and 11, G2 is a luminance level to be displayed and G1 is a luminance level lower than G2.

Hereinafter, the change in the luminance level of the region A will be described with reference to FIG. 10.

In the region A, the image data voltage of the image is applied in the N frame, the black data voltage is applied in the N+1 frame, the same image data voltage is applied in the N+2 frame, and the black data voltage is applied in the N+3 frame.

When the image data is applied as described above, the luminance level in the region A is changed as shown in FIG. 10. Particularly, since the same image data voltage is applied before and after the period in which the black data voltage is applied, a period during which display luminance falls to black luminance is shortened, and a luminance higher than the black is displayed in the N+1 and N+3 frames, but the luminance to be displayed may be sufficiently expressed. In such an embodiment, luminance to be displayed for each of the left eye image and the right eye image is observed.

Although an inserted data voltage, which is disposed between a data voltage for a left eye image and a data voltage for a right eye image, is the black data voltage, the displayed image shows luminance higher than the black, and the inserted data voltage is the same as the data voltage that displays the luminance higher than the black data voltage.

In the case of the region B, the luminance level in the region B of FIG. 9 is changed as shown in FIG. 11. In such an embodiment, since the image data voltage corresponding to the luminance to be displayed is applied only in one frame of four frames, and the black data voltage is applied in other frames of the four frames, the period in which the display luminance falls to the black luminance is extended, and the black image may be displayed with substantially low luminance, but the luminance level of G2 which is substantially high may not be displayed and only the luminance level of G1 lower than the luminance level of G2 is displayed in the four frames. Accordingly, the luminance lower than the luminance to be displayed is displayed. Similarly, the region B of FIG. 8 may display luminance lower than the luminance to be displayed.

As shown in FIG. 11, the voltage applied to the region B may be compensated and applied to compensate the luminance lowered in the region B where the left image and the right image are not overlapped with each other. It is shown in FIG. 12.

Figure 12:
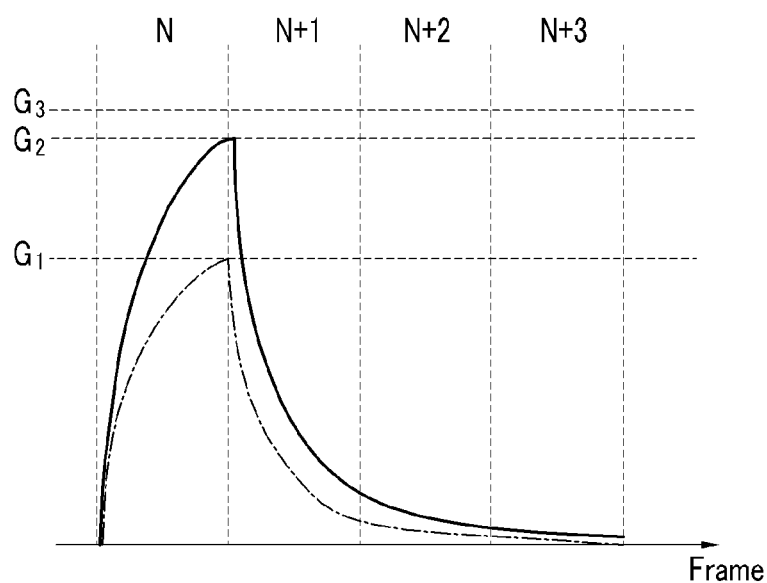
FIG. 12 is a graph showing luminance level versus frame in a region B in an alternative exemplary embodiment of a three dimensional image display device.

FIG. 12 is a graph showing a luminance level versus frame in a region B in an exemplary embodiment of a three dimensional image display device. Herein, G3 is a luminance level displayed by the modified data voltage.

In FIG. 11, the luminance level of G1 in the region B is displayed instead of the luminance level of G2 to be displayed because the response speed is low. (a dotted-line in FIG. 12) In an exemplary embodiment, data voltage higher than the data voltage applied to a region A (e.g., the data voltage which displays a luminance level of G3 in FIG. 12) may be applied such that the luminance level is changed rapidly during one frame, and the luminance level of G2 is thereby displayed. (a solid-line graph of FIG. 12)

In such an embodiment, the data voltage applied in the region B is higher than the data voltage applied in the region A such that the alignment direction of the liquid crystal layer changes more rapidly, thereby actually displaying the luminance to be displayed in the region B. In such an embodiment, although different data voltages are applied to the region A in which the left eye image and the right eye image are overlapping each other and the region B in which the left eye image and the right eye image are not overlapping each other, both region A and region B display the same luminance.

In an exemplary embodiment, the data voltage applied in the region B is higher than the data voltage applied in the region A. In an alternative exemplary embodiment, however, the data voltage applied in the region B may be lower than the data voltage applied in the region A. In an exemplary embodiment, the data voltage is modified such that the data voltage is changed to allow the alignment direction of the liquid crystal to be changed more rapidly.

In an exemplary embodiment, the image data voltage applied for the left eye image and the image data voltage applied for the right eye image are the same as each other.

Hereinafter, modification of the applied data voltage when different voltages are applied for the left eye image and the right eye image, respectively, will be described with reference to FIGS. 13 and 14.

Figure 13:
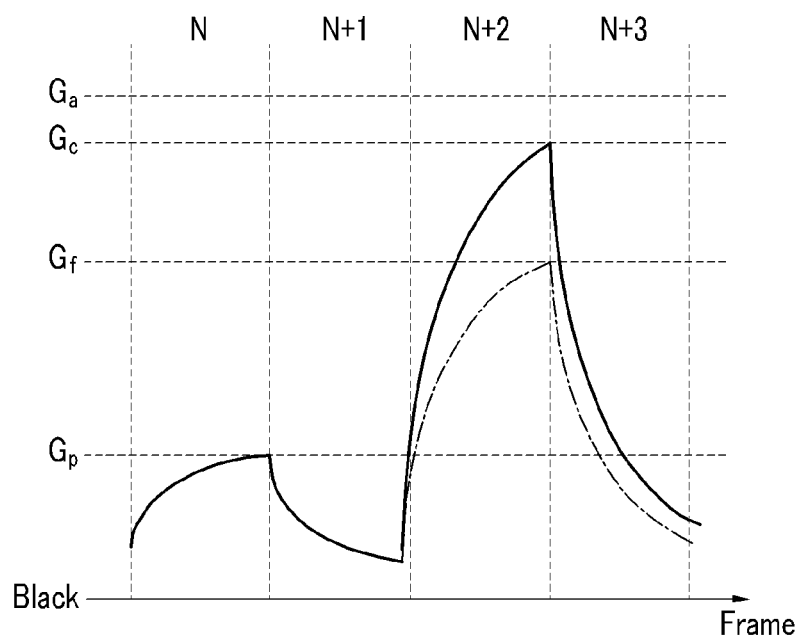
FIGS. 13 and 14 are graphs showing luminance level versus frame showing a difference in luminance level between a left eye image and a right eye image in an exemplary embodiment of a three dimensional image display device.
Figure 14:
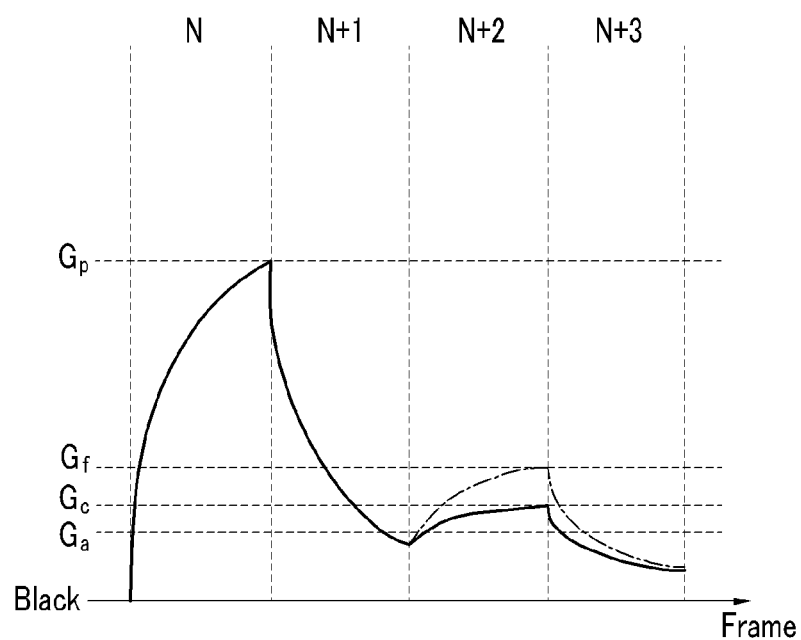

FIGS. 13 and 14 are graphs showing luminance level versus frame showing a difference in luminance level between a left eye image and a right eye image in an exemplary embodiment of a three dimensional image display device.

In FIG. 13, the left eye image displays a luminance level of Gp, and the right eye image displays a luminance level of Gc.

When the data voltage is applied to display the luminance level of Gc during one frame, e.g., the N+2 frame, a luminance level of Gf is displayed as shown as a dotted line in FIG. 13, instead of the luminance level of Gc. In an exemplary embodiment, data voltage for displaying a luminance level higher than the luminance level of Gc is applied to display the luminance level of Gc during a unit frame.

In FIG. 14, the left eye image displays the luminance level of Gp, and the right eye image displays a luminance level of Gc.

In general, when the data voltage is applied to display the luminance level of Gc, only a luminance level of Gf is displayed as shown as a dotted line of FIG. 14, instead of the luminance level of Gc. Since the inserted data (e.g., the black data or data having luminance higher than the black data) applied in the N+1 frame does not fall to such a low luminance level, a relatively higher luminance level is displayed in the N+2 frame. Therefore, the data voltage for displaying the luminance level lower than the luminance level of Gc is applied to decrease the luminance level of Gc during one frame, e.g., the N+2 frame.

In an exemplary embodiment, the data voltage higher than the black data is applied as shown in FIGS. 13 and 14, but the invention is not limited thereto. In an alternative exemplary embodiment, the data voltage may be modified in a various way to display a luminance substantially the same as the luminance to be displayed when the data voltage is applied.

Figure 15:
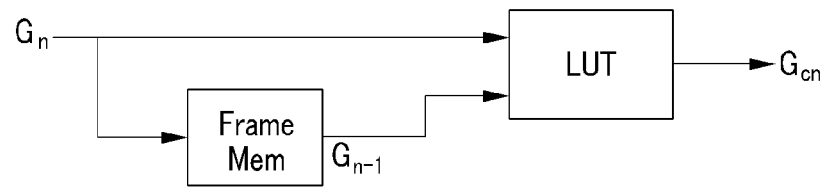
FIG. 15 is a block diagram showing an exemplary embodiment of an input data converter according to the invention.

The modification of the data voltage as shown in FIGS. 13 and 14 may be performed through an input data converter shown in FIG. 15.

FIG. 15 is a block diagram showing an exemplary embodiment of the input data converter according to the invention.

In FIG. 15, Gn and Gn-1 represent an image data for the left eye and an image data for the right eye. In an exemplary embodiment, when Gn is the image data for the left eye, Gn-1 is the image data for the right eye, and when Gn is the image data for the right eye, Gn-1 is the image data for the left eye.

In FIG. 15, LUT represents a look-up table which stores modified gray data Gcn for Gn and Gn-1. The modified gray data Gcn is the data that allows the luminance levels of the overlapping region and the non-overlapping region to be the same as each other as shown in FIGS. 6 to 9, and may have a data value greater or less than original data as shown in FIGS. 12 to 14.

In such an embodiment, the image data Gn-1 that is image data of a previous is stored in a frame memory Frame Mem and then, when the data Gn that is image data of a current frame is inputted, the modified gray data Gcn is outputted from the look-up table based on the data Gn and the data Gn-1. The outputted modified gray data Gcn is used as data for displaying the image instead of the data Gn.

In such an embodiment, the black data is inserted between the modified gray data Gcn of a frame and modified gray data of a subsequent frame.

The modified gray data Gcn is changed to the data voltage to be applied to the data line.

In an alternative exemplary embodiment, the data processing for data voltage modification may be omitted when the liquid crystal layer has substantially high response speed or the applied data is displayed substantially rapidly.

In an exemplary embodiment, data for displaying the luminance higher than the black may be inserted instead of the black data.

In general, the black data may be inserted between the image data for the left eye and the image data for the right eye, but when the difference between the image data for the left eye and the image data for the right eye is substantially large, the black may not be displayed although the black data is applied. Therefore, the inserted data for displaying the luminance higher the black may be inserted using a method in a flowchart of FIG. 16.

Figure 16:
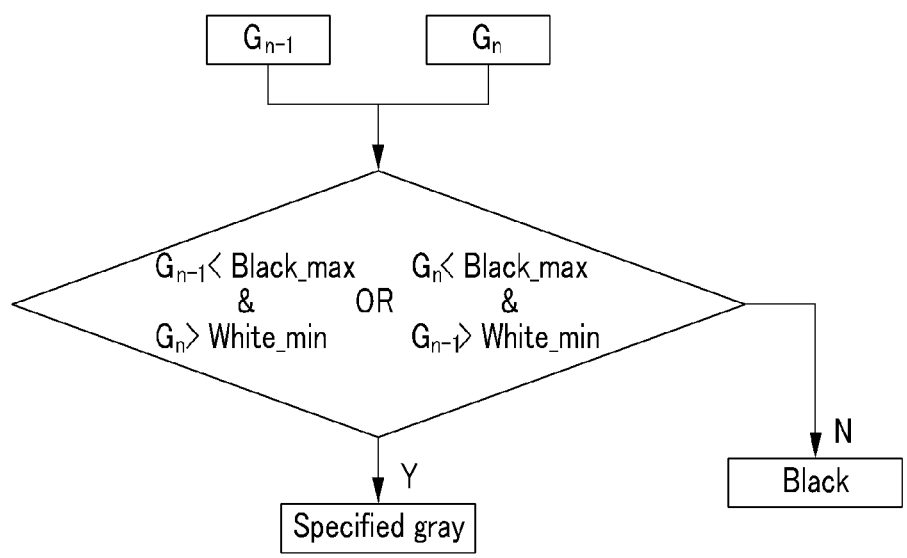
FIG. 16 is a flowchart showing an exemplary embodiment of a method of determining inserted data according to the invention.

FIG. 16 is a flowchart showing an exemplary embodiment of a method of determining the inserted data according to the invention.

In FIG. 16, Gn-1 represents one of the image data for the left eye and the image data for the right eye and Gn represents the other of the image data for the left eye and the image data for the right eye. Black_max represents a specified maximum gray data value among data for displaying a low gray and White_min represents a specified minimum gray data value among data for displaying a high gray.

In such an embodiment, the luminance may not be sufficiently changed in one frame when the image data for the left eye and the image data for the right eye are not within a range between the specified maximum gray data value Black_max and the specified minimum gray data value White_min, e.g., one of the image data for the left eye and the image data for the right eye has a data value lower than the specified maximum gray data value Black_max and the other of the image data for the left eye and the image data for the right eye has a data value greater than the specified minimum gray data value White_min, where the image data for the left eye is changed to the image data for the right eye or vice versa. Accordingly, the specified gray data for displaying luminance higher than the black may be applied instead of the black data, and the image data for the right eye or the image data for the left eye may display the luminance to be displayed.

I, Black_max, White_min and the specified gray data value may vary based on a period of one frame and the response speed of the liquid crystal layer.

In an exemplary embodiment of the three dimensional image display device, the operations of the shutter member 300 and the display panels 100 and 200 are synchronized with each other. An additional synchronization signal generator may be included for the synchronization in the display panel, and a device that receives the synchronization signal and turns on and off a lens may be included in the shutter member 300. In an exemplary embodiment, light may be used for the synchronization between the shutter member 300 and the display panels, e.g., an infrared ("IR") communication, or a bluetooth may be used for the synchronization between the shutter member 300 and the display panels, e.g., a short-range wireless communication. In an alternative exemplary embodiment, the shutter member 300 and the display panels may be connected by a wire to be synchronized with each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three dimensional image display device, comprising:
a display panel in which at least one of two consecutive left eye images and two consecutive right eye images are inputted,
wherein the two consecutive left eye images are substantially the same as each other, and the two consecutive right eye images are substantially the same as each other frame by frame,
wherein an absolute value of a slope of a gray curve in an upper part or a lower part of the display panel gradually decreases, and then increases thereafter;
and wherein gate scanning directions of the two consecutive left eye images for all sequential gate lines are opposite to each other, and gate scanning directions of the two consecutive right eye images for all of the sequential gate lines are opposite to each other frame by frame.

2. The three dimensional image display device of claim 1, wherein
the two consecutive right eye images are inputted after the two consecutive left eye images are inputted, or the two consecutive left eye images are inputted after the two consecutive right eye images are inputted.

3. The three dimensional image display device of claim 2, wherein
one of the two consecutive left eye images and one of the two consecutive right eye images are inputted in two consecutive frames, and
the gate scanning directions of the one of the two consecutive left eye images and the gate scanning direction of the one of the two consecutive right eye images are opposite to each other.

4. The three dimensional image display device of claim 1, wherein
over-shoot driving or under-shoot driving is used to display the two consecutive left eye images and the two consecutive right eye images.

5. The three dimensional image display device of claim 4, wherein
when a first image and a second image are consecutively inputted and a gray value of the second image is greater than a gray value of the first image, the gray value of the second image increases.

6. The three dimensional image display device of claim 4, wherein
when the first image and the second image are consecutively inputted and the gray value of the second image is less than the gray value of the first image, the gray value of the second image decreases.

7. The three dimensional image display device of claim 1, wherein
the gate scanning direction is determined by an inversion signal in which a high level and a low level are alternately repeated frame by frame.

8. The three dimensional image display device of claim 7, further comprising:
a gate driver which applies gate-on voltage to the display panel, wherein the gate driver comprises:
a first scan starting signal wiring;

a second scan starting signal wiring; and a signal processor which outputs a scan starting signal which indicates a start of a gate scanning, wherein the scan starting signal is applied to the first scan starting signal wiring or the second scan starting signal wiring by the inversion signal.

9. The three dimensional image display device of claim 8, wherein when the scan starting signal is applied to the first scan starting signal wiring, the gate-on voltage starts to be applied to a first gate line, and when the scan starting signal is applied to the second scan starting signal wiring, the gate-on voltage starts to be applied to a last gate line.

10. The three dimensional image display device of claim 7, further comprising:

a data driver which applies image data voltages to the display panel, wherein an output sequence of the image data voltages is changed in each frame by the inversion signal, wherein the output sequence includes a forward sequence and a reverse sequence, and wherein the image data voltages are inputted into the data driver in the forward sequence or in the reverse sequence.

11. The three dimensional image display device of claim 1, wherein when two consecutive two dimensional images are inputted into the display panel, gate scanning directions of the two consecutive two dimensional images are the same as each other.

12. The three dimensional image display device of claim 11, wherein the gate scanning direction is controlled based on a three dimensional enable signal which has a low level when the two consecutive two dimensional images are inputted into the display panel, and has a high level when the two consecutive left eye images or the two consecutive right eye images are inputted.

13. The three dimensional image display device of claim 1, wherein a three dimensional sync signal is outputted to a shutter member, wherein an opened state or a closed state of the shutter member is synchronized with the three dimensional sync signal.

14. The three dimensional image display device of claim 13, wherein the two consecutive left eye images includes a first left eye image and a second left eye image, the two consecutive right eye images include a first right eye image and a second right eye image, and the three dimensional sync signal is synchronized with the opened state of the shutter member in a period in which the second left eye image and the second right eye image are inputted.

15. The three dimensional image display device of claim 14, wherein:

the three dimensional sync signal is synchronized with the closed state of the shutter member in a period in which the first left eye image and the first right eye image are inputted.

16. The three dimensional image display device of claim 1, further comprising:

a backlight unit which emits light.

17. The three dimensional image display device of claim 16, wherein the two consecutive left eye images include a first left eye image and a second left eye image, the two consecutive right eye images include a first right eye image and a second right eye image, and the backlight unit is turned on in the period in which the second left eye image and the second right eye image are inputted.

18. The three dimensional image display device of claim 17, wherein the backlight unit is turned off in the period in which the first left eye image and the first right eye image are inputted.

19. The three dimensional image display device of claim 1, wherein a frame frequency thereof is 240 hertz.

20. The three dimensional image display device of claim 1, wherein the gate scanning directions of the two consecutive left eye images or the two consecutive right eye images each include a gate scanning direction of an entire first frame in a first direction relative to the display panel, and a gate scanning direction of an entire second frame consecutive to the first frame in a second direction opposite to the first direction relative to the display panel.

* * * * *